(12) United States Patent
Nagai et al.

(10) Patent No.: US 9,683,599 B2
(45) Date of Patent: Jun. 20, 2017

(54) TAPERED ROLLER BEARING

(71) Applicant: JTEKT CORPORATION, Osaka-shi, Osaka (JP)

(72) Inventors: Atsushi Nagai, Kashiwara (JP); Kenichi Ono, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/075,784

(22) Filed: Mar. 21, 2016

(65) Prior Publication Data

US 2016/0281774 A1    Sep. 29, 2016

(30) Foreign Application Priority Data

Mar. 23, 2015  (JP) ................................. 2015-059504

(51) Int. Cl.

| F16C 33/46 | (2006.01) |
|---|---|
| F16C 19/36 | (2006.01) |
| F16C 33/66 | (2006.01) |
| F16C 43/08 | (2006.01) |

(52) U.S. Cl.
CPC ........ F16C 19/364 (2013.01); F16C 33/4635 (2013.01); F16C 33/6674 (2013.01); F16C 43/08 (2013.01); F16C 2300/02 (2013.01)

(58) Field of Classification Search
CPC  F16C 19/364; F16C 33/4635; F16C 33/6674; F16C 43/08; F16C 33/4605; F16C 33/6614; F16C 33/6651
See application file for complete search history.

(56) References Cited

U.S. PATENT DOCUMENTS

| 4,728,204 | A | * | 3/1988 | Colanzi | ................... | B61F 15/12 |
|---|---|---|---|---|---|---|
| | | | | | | 384/564 |
| 2015/0104126 | A1 | * | 4/2015 | Chudo | ................ | F16C 33/4605 |
| | | | | | | 384/578 |
| 2016/0061259 | A1 | | 3/2016 | Kamamoto et al. | | |

FOREIGN PATENT DOCUMENTS

| DE | 10311566 A1 | * | 10/2003 | ............ F16C 19/364 |
|---|---|---|---|---|
| EP | 2889500 A2 | * | 7/2015 | .......... F16C 33/6681 |
| JP | 3728544 B2 | * | 12/2005 | ............ F16C 19/364 |
| JP | 2007-321939 A | | 12/2007 | |

(Continued)

OTHER PUBLICATIONS

Machine Translation of DE10311566.*

*Primary Examiner* — Thomas R. Hannon
(74) *Attorney, Agent, or Firm* — Oliff PLC (57) ABSTRACT

A tapered roller bearing includes an inner ring, an outer ring, a plurality of tapered rollers provided between the inner ring and the outer ring, and an annular cage. The cage has a small-diameter annular portion on a first side in an axial direction, a large-diameter annular portion on a second side in an axial direction, and a plurality of cage bar portions. The cage has pockets that are spaces each formed between the large-diameter annular portion and the small-diameter annular portion and between the adjacent cage bar portions in a circumferential direction and in which the tapered rollers are held. The cage further has a roller retaining portion that inhibits the tapered rollers housed in the pockets from falling outward in a radial direction. A recessed portion is formed in the small-diameter annular portion to reduce rigidity of the small-diameter annular portion.

8 Claims, 6 Drawing Sheets

(56) References Cited

FOREIGN PATENT DOCUMENTS

JP       2013-221592 A    10/2013
JP       2014-214771 A    11/2014

* cited by examiner

FIRST SIDE IN AXIAL DIRECTION

SECOND SIDE IN AXIAL DIRECTION

FIRST SIDE IN AXIAL DIRECTION

SECOND SIDE IN AXIAL DIRECTION

FIG.8
(PRIOR ART)

TAPERED ROLLER BEARING

INCORPORATION BY REFERENCE

The disclosure of Japanese Patent Application No. 2015-059504 filed on Mar. 23, 2015 including the specification, drawings and abstract, is incorporated herein by reference in its entirety.

BACKGROUND OF THE INVENTION

1. Field of the Invention

The present invention relates to a tapered roller bearing.

2. Description of the Related Art

Figure 8:
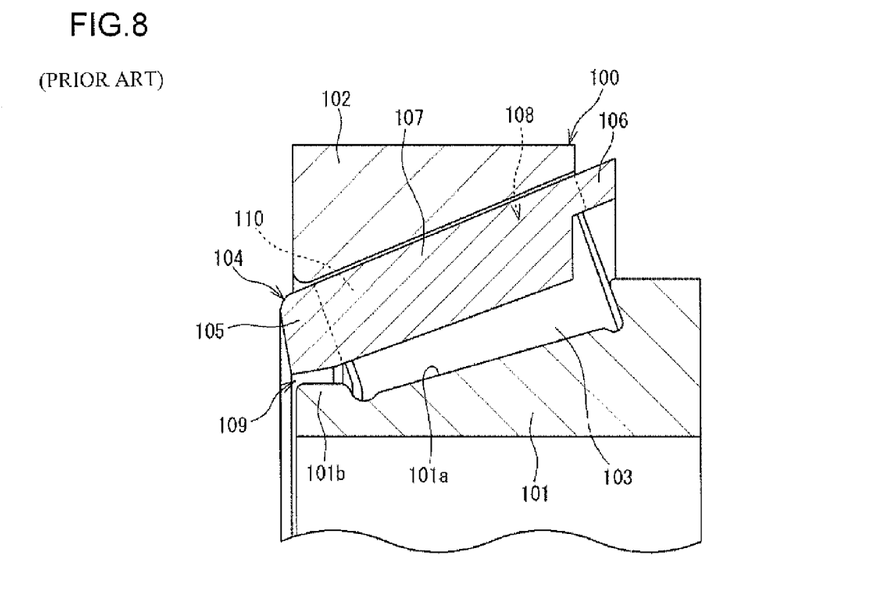
FIG. 8 is a longitudinal sectional view depicting a conventional tapered roller bearing.

A tapered roller bearing is characterized to have a larger load capacity and a higher rigidity than other rolling bearings of the same size. FIG. 8 is a longitudinal sectional view depicting a conventional tapered roller bearing 100. The tapered roller bearing 100 includes an inner ring 101, an outer ring 102, a plurality of tapered rollers 103, and an annular cage 104 (see, for example, Japanese Patent Application Publication No. 2013-221592 (JP 2013-221592 A). The cage 104 holds the tapered rollers 103 spaced at intervals in a circumferential direction.

The cage 104 has a small-diameter annular portion 105 on a first side in an axial direction (the left side in FIG. 8), a large-diameter annular portion 106 on a second side in the axial direction (the right side in FIG. 8), and a plurality of cage bar portions 107. The cage bar portions 107 couple the annular portions 105 and 106 together. Each space formed between the annular portions 105 and 106 and between the cage bar portions 107 and 107 that are adjacent in a circumferential direction serves as a pocket 108 in which the corresponding tapered rollers 103 is housed.

In the tapered roller bearing 100 (the invention described in JP 2013-221592 A), the small-diameter annular portion 105 has an increased thickness dimension (radial dimension) to restrain lubricant from entering a bearing interior through an annular opening 109 between the inner ring 101 and the outer ring 102. This enables a reduction in stirring resistance of the lubricant inside the bearing.

Assembly of the tapered roller bearing 100 as depicted in FIG. 8 can be performed as described below. First, the tapered rollers 103 are housed in the respective pockets 108 of the cage 104. The cage bar portions 107 of the cage 104 inhibit the tapered rollers 103 housed in the pockets 108 from falling outward in a radial direction. With the tapered rollers 103 held in the cage 104 (pockets 108), the inner ring 101 is moved closer to the tapered rollers 103 along the axial direction. The tapered rollers 103 are positioned on an inner-ring raceway surface 101a of the inner ring 101.

After the inner ring 101 starts to be moved closer to the tapered rollers 103 and before the tapered rollers 103 are positioned on the inner-ring raceway surface 101a, small diameter portions 110 of the tapered rollers 103 need to be displaced outward in the radial direction over a cone front face rib (hereinafter referred to as "small rib") 101b of the inner ring 101. However, the displacement is regulated by the cage bar portions 107. Thus, in the related art, a strong force is exerted on the inner ring 101 by a press or the like to press the inner ring 101 against the cage 104 with the tapered rollers 103 held in the pockets 108. When the small diameter portions 110 pass over the small rib 101b, the cage 104 is elastically deformed (the diameter of the cage 104 is increased) to position the tapered rollers 103 on the inner-ring raceway surface 101a. Thus, an inner ring unit is obtained which includes the inner ring 101, the cage 104, and the tapered rollers 103 integrated together. The outer ring 102 is assembled to the inner ring unit to complete the tapered roller bearing 100.

However, when the small diameter portions 110 of the tapered rollers 103 pass over the small rib 101b of the inner ring 101, an excessive force acts on the cage 104. As a result, the cage 104 may have reduced dimensional accuracy or may be damaged. In other words, assembly of the tapered roller bearing is not easy in which the inner ring 101 is assembled to the cage 104 with the tapered rollers 103 held therein. In particular, in the cage 104 depicted in FIG. 8, the small-diameter annular portion 105 has a large thickness dimension (large radial dimension). Thus, the cage 104 is difficult to elastically deform (the diameter of the cage 104 is difficult to increase), making assembly of the bearing having the cage 104 further difficult.

SUMMARY OF THE INVENTION

An object of the present invention is to provide a tapered roller bearing that is easy to assemble.

According to an aspect of the present invention, a tapered roller bearing includes: an inner ring having a small rib provided on a first side in an axial direction and protruding outward in a radial direction and a cone back face rib (hereinafter referred to as "large rib") provided on a second side in the axial direction and protruding outward in the radial direction; an outer ring provided outside the inner ring in the radial direction; a plurality of tapered rollers provided between the inner ring and the outer ring; and a cage having a small-diameter annular portion on the first side in the axial direction, a large-diameter annular portion on the second side in the axial direction, a plurality of cage bar portions coupling the small-diameter annular portion and the large-diameter annular portion together, and pockets that are spaces each formed between the large-diameter annular portion and the small-diameter annular portion and between the adjacent cage bar portions in a circumferential direction and in which the tapered rollers are held. The cage has a roller retaining portion that inhibits the tapered rollers housed in the pockets from falling outward in the radial direction, and a recessed portion is formed in the small-diameter annular portion to reduce rigidity of the small-diameter annular portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
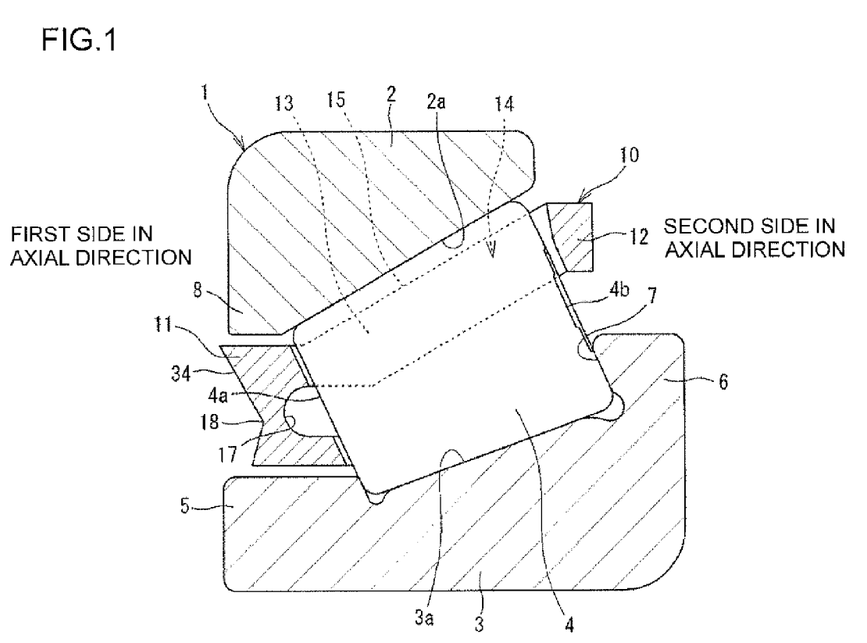
FIG. 1 is a longitudinal sectional view depicting an embodiment of a tapered roller bearing.

FIG. 1 is a longitudinal sectional view depicting an embodiment of a tapered roller bearing 1 in the present invention. The tapered roller bearing 1 includes an inner ring 3, an outer ring 2, a plurality of tapered rollers 4, and an annular cage 10. The outer ring 2 is provided radially outward of the inner ring 3. The tapered rollers 4 are provided between the inner ring 3 and the outer ring 2. The cage 10 holds the tapered rollers 4. The tapered roller bearing 1 is lubricated with lubricant (oil).

The inner ring 3 is an annular member formed of bearing steel, steel for mechanical structural use, or the like. On an outer periphery of the inner ring 3, a tapered inner-ring raceway surface 3a is formed on which the tapered rollers 4 roll. The inner ring 3 has a small rib 5 and a large rib 6. The small rib 5 is provided on a first side (the left side in FIG. 1) in an axial direction with respect to the inner-ring raceway surface 3a and protrudes outward in the radial direction. The large rib 6 is provided on a second side (the right side in FIG. 1) in the axial direction with respect to the inner-ring raceway surface 3a and protrudes outward in the radial direction.

Like the inner ring 3, the outer ring 2 is an annular member formed of bearing steel, steel for mechanical structural use, or the like. On an inner periphery of the outer ring 2, a tapered outer-ring raceway surface 2a is formed on which the tapered rollers 4 roll. The outer-ring raceway surface 2a and the inner-ring raceway surface 3a are disposed to face each other.

The tapered rollers 4 are members formed of bearing steel or the like. The tapered rollers 4 roll on the inner-ring raceway surface 3a and the outer-ring raceway surface 2a. Each of the tapered rollers 4 has a roller small end face 4a with a small diameter on the first side in the axial direction and a roller large end face 4b on the second side in the axial direction. The roller large end face 4b comes into sliding contact with a rib surface 7 of the large rib 6 of the inner ring 3.

Figure 2:
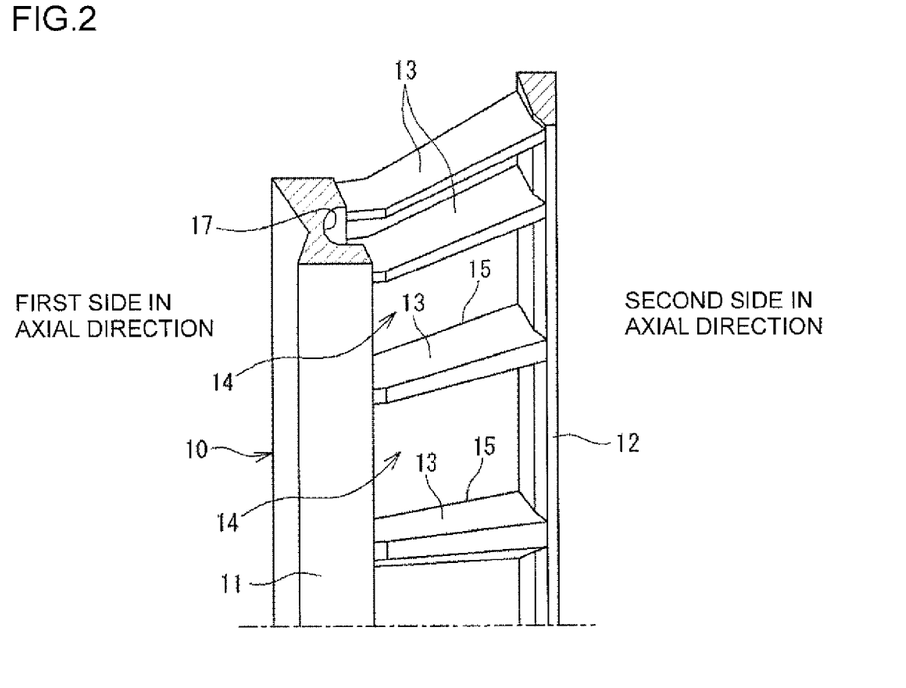
FIG. 2 is a diagram illustrating a part of a cage as viewed from the inside of the cage.

FIG. 2 is a diagram illustrating a part of the cage 10 as viewed from the inside of the cage 10. In FIG. 1 and FIG. 2, the cage 10 has a small-diameter annular portion 11 on the first side in the axial direction, a large-diameter annular portion 12 on the second side in the axial direction, and a plurality of cage bar portions 13 spaced at intervals in a circumferential direction. The small-diameter annular portion 11 and the large-diameter annular portion 12 are shaped like rings and provided at a predetermined distance from each other in the axial direction. The cage bar portions 13 couple the small-diameter annular portion 11 and the large-diameter annular portion 12 together. Pockets 14 in which the tapered rollers 4 are held (housed) are spaces that are each formed between the small-diameter annular portion 11 and the large-diameter annular portion 12 and between two adjacent cage bar portions 13 in the circumferential direction.

Figure 3:
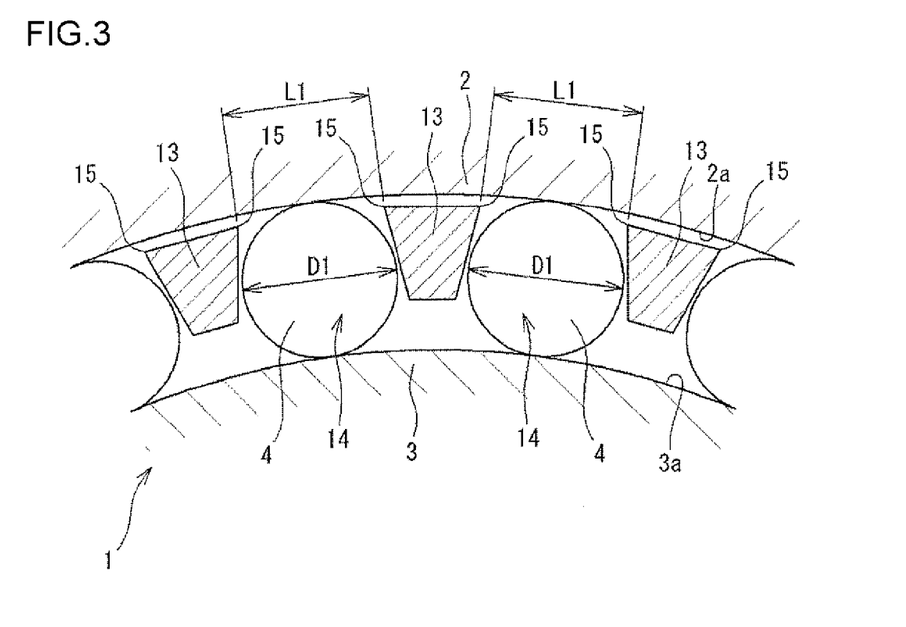
FIG. 3 is a schematic diagram of a part of the tapered roller bearing as viewed in a direction parallel to centerlines of tapered rollers.

The cage 10 has roller retaining portions 15 that inhibit the tapered rollers 4 housed in the pockets 14 from falling outward in the radial direction (falling outward during assembly of the bearing). FIG. 3 is a schematic diagram of a part of the tapered roller bearing 1 as viewed in a direction parallel to centerlines of the tapered rollers 4. The roller retaining portions 15 in the present embodiment are radially outer parts of the cage bar portions 13. As depicted in FIG. 3, in a transverse section orthogonal to a bearing centerline, a circumferential dimension L1 between a pair of the roller retaining portions 15 positioned on both sides of one centrally located pocket 14 is smaller than a diameter D1 of the corresponding tapered roller 4 in the transverse section (L1<D1). Thus, upon starting to be displaced outward in the radial direction, the tapered roller 4 in the pocket 14 comes into contact with the pair of roller retaining portions 15 and is prevented from falling outward in the radial direction.

The cage 10 is positioned in the radial direction by the roller retaining portions 15 contacting outer peripheral surfaces of the tapered rollers 4. The cage 10 (see FIG. 1) is positioned in the axial direction by the large-diameter annular portion 12 contacting the roller large end faces 4b of the tapered rollers 4. In other words, in the tapered roller bearing 1 in the present embodiment, the cage 10 is guided by rolling elements. Alternatively, the cage 10 may be positioned in the radial direction by (a part) of a radially outer surface of the cage 10 contacting an inner peripheral surface of the outer ring 2 (in other words, in the tapered roller bearing 1, the cage 10 may be guided by the outer ring in the radial direction).

The cage 10 in the present embodiment is formed of resin (synthetic resin) and can be shaped by injection molding. The cage 10 may be formed of, for example, a polyphenylene sulfide resin (PPS) or fiber reinforced plastic (FRP) in order to offer resistance to lubricant (oil resistance). Thus, the cage 10 is hard and relatively difficult to elastically deform.

In FIG. 1, the cage 10 is provided in an annular space (hereinafter also referred to as a bearing interior) defined between the inner ring 3 and the outer ring 2. The cage 10 houses one tapered roller 4 in each of the pockets 14 and holds a plurality of the tapered rollers 4 such that the tapered rollers 4 are disposed at equal intervals in the circumferential direction. The small-diameter annular portion 11 in the present embodiment is positioned between an end portion 8 of the outer ring 2 located on the first side in the axial direction (hereinafter also referred to as the outer ring end portion 8) and the small rib 5, which is an end portion of the inner ring 3 on the first side in the axial direction.

In the tapered roller bearing 1, the inner peripheral surface of the outer ring 2 (outer-ring raceway surface 2a) increases in diameter from the first side toward the second side in the axial direction. Thus, when the tapered roller bearing 1 (in the present embodiment, the inner ring 3) rotates, the lubricant flows through the annular space defined between the inner ring 3 and the outer ring 2 from the first side toward the second side in the axial direction (pumping action). Such pumping action associated with rotation of the tapered roller bearing 1 enables the lubricant located outside the bearing to flow from the first side in the axial direction into the annular space (bearing interior) between the outer ring 2 and the inner ring 3. The lubricant having flowed into the annular space flows out through a portion of the bearing on the second side in the axial direction. In other words, the lubricant passes though the bearing interior.

Figure 4:
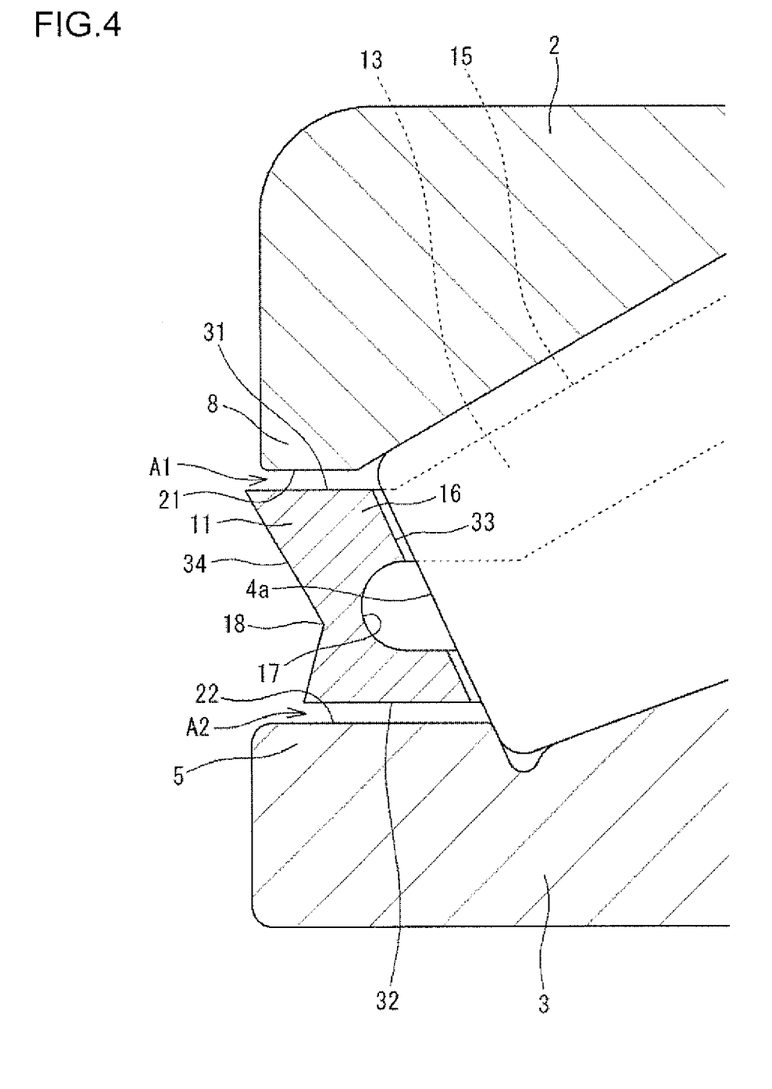
FIG. 4 is an enlarged sectional view of a small-diameter annular portion and a periphery thereof.

FIG. 4 is a sectional view depicting the small-diameter annular portion 11 and a periphery thereof. The small-diameter annular portion 11 in the present embodiment has an outer annular surface (hereinafter referred to as an outer annular surface 31) that faces an inner peripheral surface 21 of the outer ring end portion 8 with an annular gap A1 therebetween. The small-diameter annular portion 11 has an inner annular surface (hereinafter referred to as an inner annular surface 32) that faces an outer peripheral surface 22 of the small rib 5 with an annular gap A2 therebetween. In the present embodiment, the inner peripheral surface 21 of the outer ring end portion 8 and the outer annular surface 31 of the small-diameter annular portion 11 are straight cylindrical surfaces centered on the centerline of the tapered roller bearing 1. The outer peripheral surface 22 of the small rib 5 and the inner annular surface 32 of the small-diameter annular portion 11 are straight cylindrical surfaces centered on the centerline of the tapered roller bearing 1.

The inner peripheral surface 21 of the outer ring end portion 8 and the outer annular surface 31 are close to each other. The radial dimension of the annular gap A1, located radially outward, is set to be very small (for example, less than 1 mm). Consequently, the lubricant present outside of the bearing and on the first side in the axial direction can be restrained from flowing into the bearing through the annular gap A1. The outer peripheral surface 22 of the small rib 5 and the inner annular surface 32 are close to each other. The radial dimension of the annular gap A2, located radially inward, is set to be very small (for example, less than 1 mm). Consequently, the lubricant present outside of the bearing and on the first side in the axial direction can be restrained from flowing into the bearing through the annular gap A2.

As described above, the small-diameter annular portion 11 has a larger radial dimension (than the large-diameter annular portion 12). The small-diameter annular portion 11 is positioned between the small rib 5 and the outer ring end portion 8. The very small annular gap A2 is formed between the small-diameter annular portion 11 and the small rib 5. The very small annular gap A1 is formed between the small-diameter annular portion 11 and the outer ring end portion 8. An annular opening is formed between the small rib 5 and the outer ring end portion 8. The small-diameter annular portion 11 is configured to close the annular opening with the annular gaps A1 and A2 remaining between the small-diameter annular portion 11 and each of the outer ring end portion 8 and the small rib 5.

In FIG. 4, a (first) recessed portion 17 is formed in the small-diameter annular portion 11. The recessed portion 17 reduces the rigidity of the small-diameter annular portion 11. In the embodiment depicted in FIG. 4, besides the first recessed portion 17, a second recessed portion 18 is formed. The second recessed portion 18 will be described below.

The first recessed portion 17 is formed in an inner surface 33 of the small-diameter annular portion 11 on the second side in the axial direction. In other words, the first recessed portion 17 is formed at a position on the small-diameter annular portion 11 where the first recessed portion 17 faces the roller small end faces 4a of the tapered rollers 4. The first recessed portion 17 is open toward the roller small end faces 4a. The first recessed portion 17 in the present embodiment is shaped, in a longitudinal section, like a semicircle at the bottom of the first recessed portion 17. In the small-diameter annular portion 11 that is shaped like a ring the recessed portion 17 is formed like a continuous annular groove along the circumferential direction. The recessed portion 17 need not be an annular groove.

The first recessed portion 17 makes a radially outer part (outer annular surface 31) and a radially inner part (inner annular surface 32) of the small-diameter annular portion 11 large in axial dimension. A radially central part of the small-diameter annular portion 11 has a smaller axial dimension than the radially outer and inner parts. This reduces the rigidity of the small-diameter annular portion 11. In particular, the first recessed portion 17 is provided at a position where the first recessed portion 17 faces the roller small end faces 4a of the tapered rollers 4. Thus, a portion of the small-diameter annular portion 11 that is near a coupling portion 16 coupled to the cage bar portions 13 is shaped to be easily deflected (easily elastically deformed) in a diameter increase direction.

The second recessed portion 18 is formed in the small-diameter annular portion 11 depicted in FIG. 4 to further reduce the rigidity of the small-diameter annular portion 11. The second recessed portion 18 is formed in an outer surface 34 of the small-diameter annular portion 11 the first side in the axial direction. In other words, the second recessed portion 18 is formed to be open toward a bearing exterior on the first side in the axial direction (the left side in FIG. 4) with respect to the small-diameter annular portion 11. The second recessed portion 18 in the present embodiment is shaped, in a longitudinal section, like a notch (like the character V) defined by two straight lines. In the small-diameter annular portion 11, shaped like a ring, the recessed portion 18 is formed like a continuous annular groove along the circumferential direction.

The second recessed portion 18 makes the radially outer part (outer annular surface 31) and the radially inner part (inner annular surface 32) of the small-diameter annular portion 11 large in axial dimension. The radially central part of the small-diameter annular portion 11 has a smaller axial dimension than the radially outer and inner parts. This further reduces the rigidity of the small-diameter annular portion 11.

In particular, the second recessed portion 18 is shaped to be open toward the bearing exterior on the first side in the axial direction (the left side in FIG. 4) with respect to the small-diameter annular portion 11. Thus, the portion of the small-diameter annular portion 11 that is near the coupling portion 16 coupled to the cage bar portions 13 is shaped to be easily deflected (elastically deformed) in the diameter increase direction.

A function of the recessed portion 17 (18) formed in the small-diameter annular portion 11 described above will be described. The function (first function) is demonstrated during assembly of the tapered roller bearing 1.

Figure 5A:
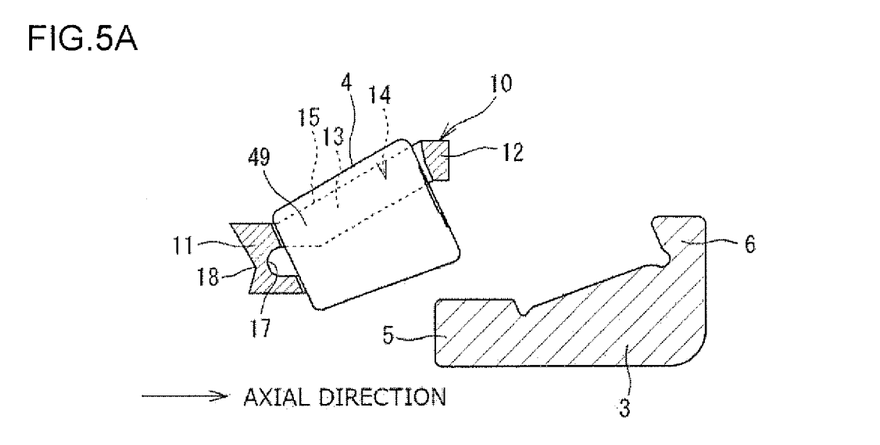
FIGS. 5A, 5B, and 5C are diagrams illustrating an assembly procedure for the tapered roller bearing.
Figure 5B:
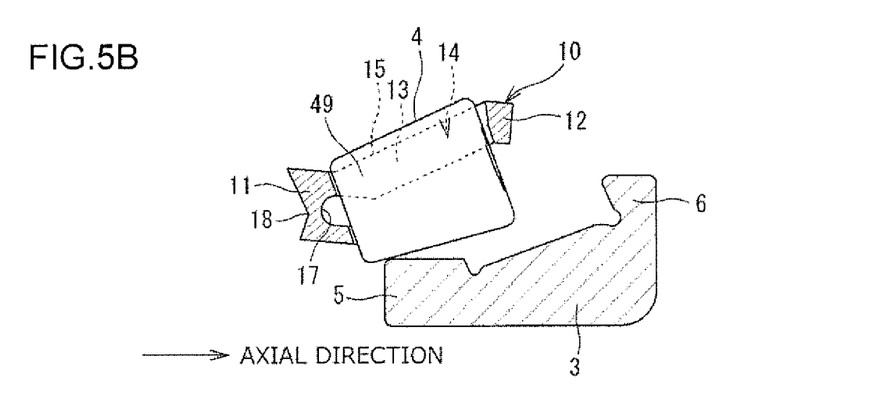
Figure 5C:
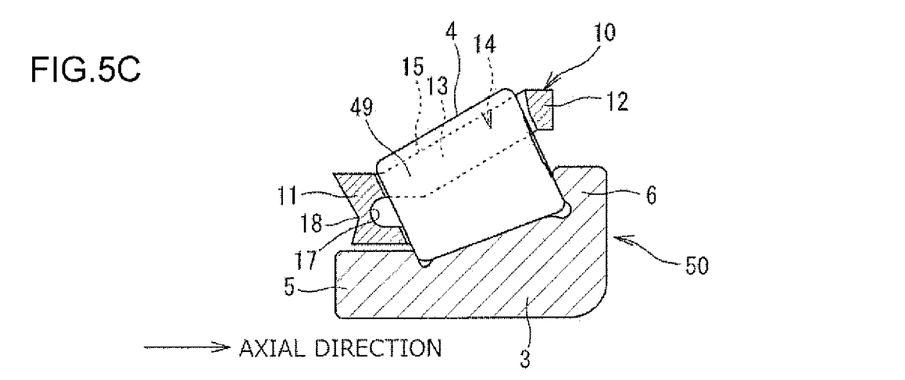

FIGS. 5A, 5B, and 5C are diagrams illustrating an assembly procedure for the tapered roller bearing 1 depicted in FIG. 1. In FIG. 5A, when the tapered roller bearing 1 is assembled, first, the cage 10 is combined with the tapered rollers 4, and the resultant cage 10 is assembled to the inner ring 3 (FIG. 5C). Thus, during the assembly, the tapered rollers 4 housed in the pockets 14 need to be inhibited from falling outward in the radial direction. For this purpose, the cage 10 in the present embodiment has the roller retaining portions 15 as described above (see FIG. 3). Installation of the tapered rollers 4 in the cage 10 is performed by placing the tapered rollers 4 in the respective pockets 14 from an inner peripheral side of the cage 10.

To assemble the tapered roller bearing 1, first, the tapered rollers 4 are housed in the respective pockets 14 of the cage 10 as depicted in FIG. 5A. The assembly is performed by bringing the cage 10 with the tapered rollers 4 housed therein and the inner ring 3 close to each other along the axial direction. At this time, the tapered rollers 4 are inhibited by the roller retaining portions 15 from falling outward in the radial direction, which facilitates the assembly. During the assembly, a small diameter portion 49 of each of the tapered rollers 4 needs to pass over the small rib 5 of the inner ring 3 as depicted in FIG. 5B. The small diameter portion 49 of the tapered roller 4 needs to be displaced outward in the radial direction to deform a part of the cage 10 near the small-diameter annular portion 11 outward in the radial direction.

Since the second recessed portion 17 (18) is formed in the small-diameter annular portion 11, the small-diameter annular portion 11 has such a shape that the small-diameter annular portion 11 is easily deformed, as described above. This allows the tapered rollers 4 to push and elastically deform the part of the cage 10 near the small-diameter annular portion 11 outward in the radial direction and to pass over the small rib 5 easily, which facilitates the assembly. In the present embodiment, the small-diameter annular portion 11 is easily deformed. This enables the assembly to be achieved by an operator's hands (manually) without the use of a press.

As depicted in FIG. 5C, when the tapered rollers 4 and the cage 10 are assembled to the inner ring 3, radially outward movement of the tapered rollers 4 is restricted, and the tapered rollers 4 are caught on the small rib 5 and the large rib 6 and precluded from moving in the axial direction. Consequently, the tapered rollers 4 cannot be disassembled from the cage 10. Thus, for example, even if an inner ring unit 50 with the inner ring 3, the tapered rollers 4, and the cage 10 is dropped onto the floor or the like, the inner ring 3, the tapered rollers 4, and the cage 10 can be prevented from being disassembled from one another.

Although not depicted in the drawings, the tapered roller bearing 1 is constructed by bringing the outer ring 2 and the inner ring unit 50 with the inner ring 3, the tapered rollers 4, and the cage 10 integrated together close to each other in the axial direction to assemble the outer ring 2 to the inner ring unit 50.

As described above, in assembly of the tapered roller bearing 1 in the present embodiment, the tapered rollers 4 are housed in the pockets 14 of the cage 10. The cage 10 with the tapered rollers 4 housed therein and the inner ring 3 are moved toward each other in the axial direction and assembled to the inner ring 3. At this time, the tapered rollers 4 are inhibited by the roller retaining portions 15 from falling outward in the radial direction, which facilitates the assembly. During the assembly, the small diameter portion 49 of each of the tapered rollers 4 needs to pass over the small rib 5 of the inner ring 3. Since the tapered rollers 4 are inhibited by the roller retaining portions 15 from falling outward in the radial direction, when the tapered rollers 4 pass over the small rib 5, the small diameter portion 49 of each of the tapered rollers 4 is displaced outward in the radial direction to deform the part of the cage 10 near the small-diameter annular portion 11 outward in the radial direction. In particular, the small-diameter annular portion 11 has an increased radial dimension in order to close the annular opening between the inner ring 3 and the outer ring 2. Thus, if the recessed portions 17 and 18 are absent, the part of the cage 10 near the small-diameter annular portion 11 has a high rigidity and is difficult to deform. This makes assembly of the inner ring 3 to the unit with the cage 10 and the tapered rollers 4 difficult. However, in the present embodiment, the first recessed portion 17 is formed in the small-diameter annular portion 11 to reduce the rigidity. This makes the small-diameter annular portion 11 easily deflected. Consequently, the tapered rollers 4 can easily pass over the small rib 5 by pushing the part of the cage 10 near the small-diameter annular portion 11 outward in the radial direction to deform (elastically deform) the part. The assembly is thus facilitated.

In particular, the first recessed portion 17 is formed at the position in the small-diameter annular portion 11 where the first recessed portion 17 faces the roller small end faces 4a of the tapered rollers 4. This makes the small-diameter annular portion 11 and a part of each cage bar portion 13 continuous with the small-diameter annular portion 11 more easily deflected outward in the radial direction, which facilitates the assembly. In the present embodiment, the second recessed portion 18 is also formed in the small-diameter annular portion 11. Thus, the small-diameter annular portion 11 is further easily deflected, which contributes to facilitating the assembly. As described above, the cage 10 is formed of a resin harder than resins conventionally used so that the cage 10 has enhanced oil resistance. However, the recessed portion 17 (18) allows the small-diameter annular portion 11 to be easily deflected (as compared to the case where the recessed portion 17 (18) is not provided).

When the thus assembled tapered roller bearing 1 is assembled in a rotating portion of a vehicle or any of various types of equipment, in other words, when the tapered roller bearing 1 is in use, the first recessed portion 17 is used as a space in which the lubricant can be housed. For example, when rotation of the tapered roller bearing 1 is stopped to stop rotation of the cage 10, the lubricant is housed in the first recessed portion 17. When the rotation of the tapered roller bearing 1 is resumed, the lubricant housed in the first recessed portion 17 can be used for lubrication. In other words, the first recessed portion 17 is used as a space where the lubricant can be housed when the rotating cage 10 is stopped (a second function of the recessed portion 17).

Figure 6:
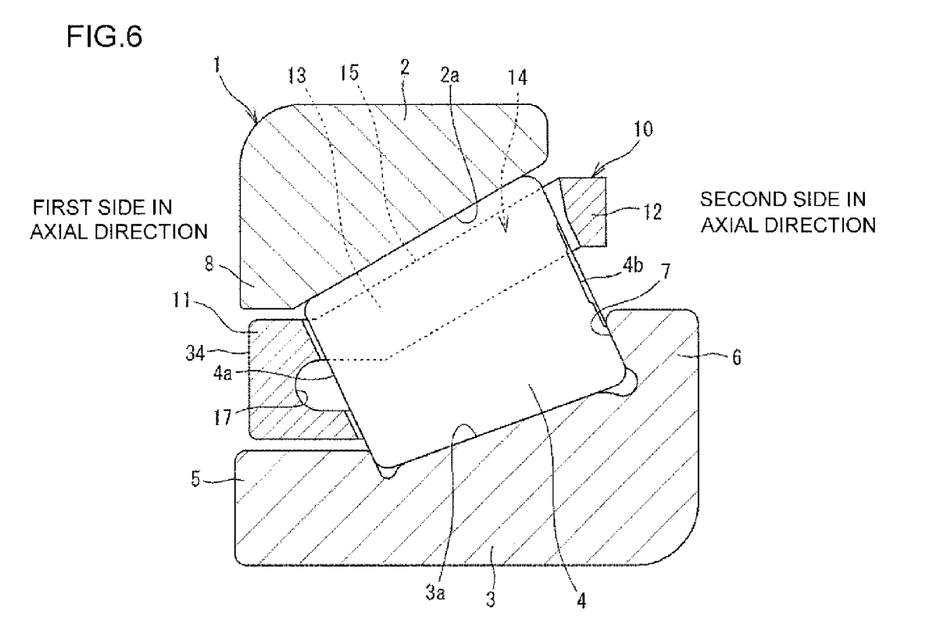
FIG. 6 is a longitudinal sectional view depicting another form of the cage.

FIG. 6 is a longitudinal sectional view depicting another form of the cage 10. As depicted in FIG. 1, in the above-described embodiment, both the first recessed portion 17 and the second recessed portion 18 are formed in the small-diameter annular portion 11. However, the first recessed portion 17 may be exclusively formed as depicted in FIG. 6. In this case, the configuration of the small-diameter annular portion 11 is the same as the configuration of the small-diameter annular portion 11 depicted in FIG. 1 except for the shape of the outer surface 34 of the small-diameter annular portion 11.

Figure 7:
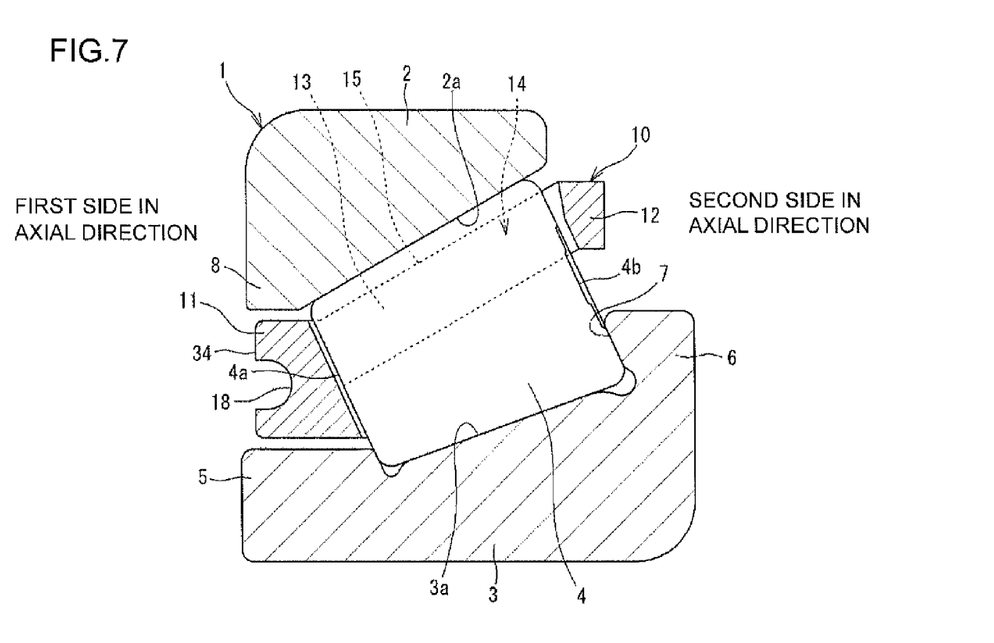
FIG. 7 is a longitudinal sectional view depicting yet another form of the cage.

FIG. 7 is a longitudinal sectional view of yet another form of the cage 10. As depicted in FIG. 7, the (second) recessed portion 18 may be exclusively formed in the small-diameter annular portion 11. The recessed portion 18 may have, in a longitudinal section, a semicircular shape at the bottom thereof instead of the V shape.

The embodiment disclosed above is illustrative in every way and is not restrictive. In other words, the tapered roller bearing in the present invention is not limited to the illustrated forms but may be in another form within the scope of the present invention. The shape of the recessed portion 17 (18) may not be the shapes in the illustrated forms and is changeable. Another form may also be used for the roller retaining portions 15 that inhibit the tapered rollers 4 housed in the pockets 14 from falling outward in the radial direction.

In the present invention, the small-diameter annular portion of the cage is shaped to be easily deflected. When assembled to the inner ring, the tapered rollers can easily pass over the small rib by pushing the part of the cage near the small-diameter annular portion outward in the radial direction, which facilitates the assembly.

What is claimed is:
1. A tapered roller bearing comprising:
an inner ring having a small rib provided on a first side in an axial direction and protruding outward in a radial direction and a large rib provided on a second side in the axial direction and protruding outward in the radial direction;
an outer ring provided outside the inner ring in the radial direction;

a plurality of tapered rollers provided between the inner ring and the outer ring; and a cage having a small-diameter annular portion on the first side in the axial direction, a large-diameter annular portion on the second side in the axial direction, a plurality of cage bar portions coupling the small-diameter annular portion and the large-diameter annular portion together, and pockets that are spaces each formed between the large-diameter annular portion and the small-diameter annular portion and between the adjacent cage bar portions in a circumferential direction and in which the tapered rollers are held, wherein the cage has a roller retaining portion that inhibits the tapered rollers housed in the pockets from falling outward in the radial direction, a recessed portion is formed in the small-diameter annular portion to reduce rigidity of the small-diameter annular portion, the recessed portion is provided at a radially inner position relative to a coupling portion of the small-diameter annular portion that is coupled to the cage bar portions, and the recessed portion is formed as a continuous annular groove along the circumferential direction.

2. The tapered roller bearing according to claim 1, wherein
the recessed portion is used as a space where lubricant is enabled to be housed.

3. The tapered roller bearing according to claim 1, wherein
the recessed portion is formed to be open toward a bearing exterior on the first side in the axial direction with respect to the small-diameter annular portion.

4. The tapered roller bearing according to claim 3, wherein
the recessed portion is used as a space where lubricant is enabled to be housed.

5. The tapered roller bearing according to claim 1, wherein
the recessed portion is formed at a position in the small-diameter annular portion where the recessed portion faces roller small end faces of the tapered rollers.

6. The tapered roller bearing according to claim 5, wherein the recessed portion is used as a space where lubricant is enabled to be housed.

7. The tapered roller bearing according to claim 5, wherein
the recessed portion is formed to be open toward a bearing exterior on the first side in the axial direction with respect to the small-diameter annular portion.

8. The tapered roller bearing according to claim 7, wherein
the recessed portion is used as a space where lubricant is enabled to be housed.

\* \* \* \* \*